Oct. 23, 1962 E. M. FRIMMER 3,059,903
CLAMPING MEANS FOR USE IN ADJUSTMENT OF
AUTOMATIC TRANSMISSION ACTUATING MEANS
Filed April 13, 1960
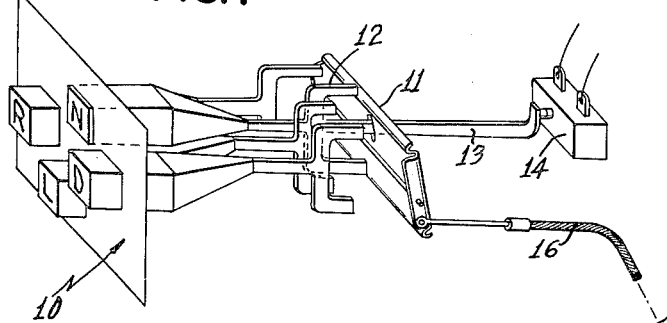
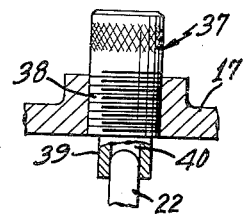
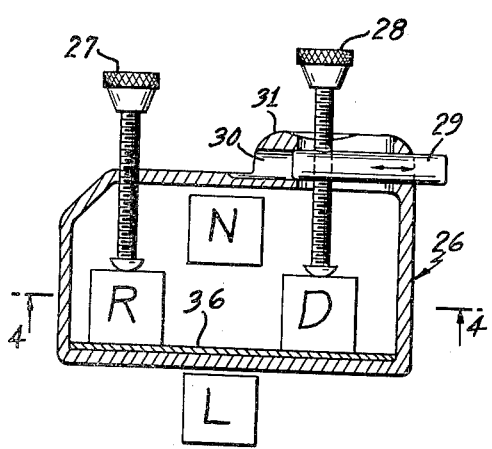
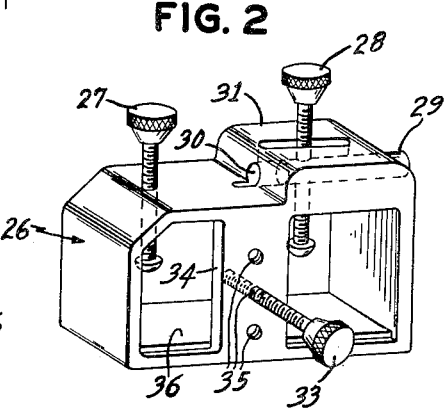
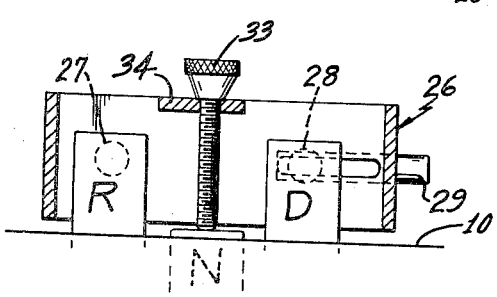
INVENTOR.
ELLIOT M. FRIMMER
BY
ATTORNEYS United States Patent Office 3,059,903
Patented Oct. 23, 1962

3,059,903
CLAMPING MEANS FOR USE IN ADJUSTMENT OF AUTOMATIC TRANSMISSION ACTUATING MEANS
Elliot M. Frimmer, North Bellmore, N.Y., assignor to Merlin Tool Corporation, a corporation of New York
Filed Apr. 13, 1960, Ser. No. 21,965
4 Claims. (Cl. 254—1)

This invention relates to the adjustment of the actuating systems of automaitc transmissions in motor vehicles. More particularly, it relates to a method and apparatus for adjusting such actuating systems wherein a control panel on the dashboard is operatively connected by means of a control cable to a lever in the transmission which, in turn, operates a valve actuator for controlling fluid flow in the transmission.

Prolonged use of transmissions of the type described above often results in looseness of the control cable and a resultant malfunction of the lever and valve actuator. Hence, readjustment of these moving parts is frequently necessary. This adjustment is normally made by loosening the control cable, realigning the lever and valve actuator and tightening the cable once again to secure these parts in their proper relative positions. Heretofore, this has been accomplished only by the efforts of two mechanics. One man was required at the control panel to insure proper correlation between the control panel and the mechanism in the transmission while the other would make the required readjustment of the moving parts in the transmission. This second mechanic would loosen the control cable and insert a tool into the transmission housing to realign the lever with respect to the valve actuator. Since such realignment was indicated only by the feel of the parts (the valve actuator is not visible during this process), it required great skill and experience and could not be made with any assurance of accuracy.

The method of the present invention, however, is one which can be performed by a single person of considerably less skill and experience and which results in proper and accurate adjustment virtually in every instance. It is applicable to the adjustment of automatic transmission actuating systems wherein movement of a control cable a predetermined distance turns a lever which normally displaces a transmission actuator. Broadly stated, the new method comprises the steps of moving the cable one of said predetermined distances. Then the cable is held in this position and the lever is restrained from movement. Finally, the cable is adjusted until the actuator is in the proper position corresponding to the position of the cable.

In accordance with the invention, this method is carried out by novel apparatus for use with an automatic transmission actuating system of the type which includes a control panel having a plurality of push buttons each adapted to displace a control cable a predetermined distance to turn a lever which displaces a transmission actuator. The new apparatus comprises separate clamping and locking devices. The clamping device includes a bracket member and fastening means on the bracket member for holding it on said control panel. Means are also included on said bracket member for depressing at least one of the buttons to maintain it in a depressed position. The locking device includes a body member and mounting means thereon for locating the locking device relative to said lever. Connecting means are included on the body member to engage the lever and restrain its movement.

By practice of this invention, a single mechanic can attach the clamping device described above to the push buttons on the control panel and fully depress one of the push buttons. Then he may proceed to the other end of the control cable and locate the lever in its proper position relative to the depressed push button by means of the locking device. He next adjusts the control cable to eliminate any looseness or play in it and removes both the clamping and locking devices. Complete assurance is provided that displacement of the control cable will thereafter result only in the appropriate positioning of the transmission actuator. It is evident that this method, as carried out by the new apparatus, does not rely on touch or feel and requires the service of only one man. Therefore, it makes a considerable improvement in accuracy and economy over the methods practiced heretofore.

A preferred embodiment of the invention is described hereinbelow with reference to the accompanying drawing, wherein FIG. 1 represents a typical automatic transmission actuating system including a control panel push button assembly shown in perspective, the control cable broken away, and the elements within the transmission in fragmentary section;

FIG. 2 is a front perspective view of the new clamping device;

FIG. 3 is a sectional elevation taken vertically through the center of said clamping device;

FIG. 4 is a section taken along lines 4—4 of FIG. 3; and

FIG. 5 is a fragmentary elevation partly broken away of the new lever arm locking device.

FIG. 1 shows a control panel 10 with push buttons N, R, D, L (denoting respectively the neutral, reverse, drive and low conditions of the transmission) extending therefrom and adapted to slide parallel to one another and normal to the face of the panel. Such a panel is usually positioned on the dashboard of the motor vehicle with which it is associated. As shown, the neutral button N is depressed to a position where it is only slightly protruding from the panel 10. Each button is connected to a slide adapted to engage a rocker element 11 and hold it at a given angular position. In FIG. 1, for example, a slide 12 on the neutral button N is engaged with the rocker element 11. Forming a part of the slide 12 and extending through the rocker element 11 is an arm 13 which is adapted to actuate a first starter motor switch 14 when the button N is fully depressed.

Connected to the rocker element 11 is a control cable 16, the core element of which is adapted to be displaced a predetermined distance depending upon the angular position of the rocker element 11 which, in turn, is determined by which push button is depressed. The cable 16 extends into a housing 17 through an aperture 18 and is connected to a lever 19 pivotally mounted therewithin about a pin 20. By this construction, the valve lever 19 is free to pivot when the cable 16 is operated by the push button on the control panel 10. A removable second starter switch 21 is threaded into the housing in operable contact with an arm portion 22 of the lever 19 when the button N is fully depressed and the lever 19 is in neutral position. Thus, the starter motor is not activated until both the switches 14 and 21 are closed.

A resiliently mounted valve actuator 23 is normally spring urged in to one of several grooves 24 defined along one arcuate edge of the lever 19. The bottom of each groove is at a different distance from the pin 20 so that depending on the angular position of the lever 19 the actuator 23 will assume different longitudinal positions and set up various conditions in the automatic transmission. For example, the groove 24 shown engaged with the actuator 23 in FIG. 1 causes the transmission to be in neutral.

In the operation of the conventional actuating system described above it often happens that the core element of the control cable 16 loosens. When this happens and the buttons are subsequently depressed, the actuator 23 only partially falls into its proper groove when the various push buttons are depressed or, at worst, remains suspended between the grooves. This results, of course, in improper shifting or possible transmission failure since the transmission does not receive its suitable fluid flow.

The former method of adjusting a control cable was a two-man operation. One man was required solely to hold one of the buttons in a fully depressed position while the other, after loosening the control cable 16, would blindly feel around in the housing 17 through the aperture 18 with a screw driver or other suitable tool until he felt the valve actuator 23 fall into the proper groove corresponding to the button depressed. Then the second man would tighten the cable 16. Obviously, there was no certainty that a proper adjustment had been made and often as not readjustment was necessary.

Those shortcomings are eliminated entirely by the present invention. A clamping device is shown in FIG. 2 which includes an annular bracket 26. A first attachment screw 27 is threaded into the top of the bracket 26 and a second attachment screw 28 is threaded through a rod 29 which is slidable in a lateral bore 30 formed on a raised portion 31 on the top of the bracket. A depressing screw 33 is threaded perpendicular to the screws 27 and 28 into a cross-piece 34 which connects the upper and the lower surface of the bracket 26. A plurality of alternate threaded holes 35 are formed in the cross-piece 34 so that the depressing screw 33 can be inserted in either of various positions relative to the bracket 26, always perpendicular to the attachment screws 27 and 28. Mounted on the lower inside surface of the bracket 26 is a resilient pad 36.

FIG. 3 shows the clamping device in operating position on the control panel assembly of FIG. 1. The attachment screws 27 and 28 are tightened down against the push buttons R and D respectively so that the undersides of those buttons are pressed tightly against the pad 36. In this manner, the clamping device is held securely on the control panel. Then the screw 33 is inserted into one of the appropriate holes 34 as shown in FIG. 4 to depress the neutral button N. With the neutral button held firmly depressed by means of the clamping device the transmission actuating system is in the position shown in FIG. 1.

According to the invention the second starter switch 21 is removed and a locking device 37 (shown in FIG. 5) is threaded in its place in the housing 17. The locking device consists of a substantially cylindrical body with a threaded portion 38 adapted to be seated in the housing and a stem portion 39 of smaller diameter than the threaded portion 38 which has an axial bore 40 extending through it. When the lever 19 is in the neutral position shown and the locking device 37 is threaded into what is normally the seat of the switch 21, the arm portion 22 is disposed within the axial bore 40. Movement of the lever 19 is thus prevented.

Consequently, the clamping apparatus insures that the push button assembly is in neutral position and the locking device insures that the various moving elements within the transmission housing 17 are in like neutral position. Therefore, it remains only to tighten the core element of the cable 16 and the system is placed in accurate adjustment. The locking device 37 is then unthreaded from the housing 17 and is replaced by the second starter switch 21. Also, the clamping device is removed from the various push buttons on the control panel 10. Thereafter, displacement of any of the push buttons to a fully depressed condition will result in precisely the desired displacement of the transmission actuator 23 within the housing 17.

I claim:
1. Adjusting apparatus for use with an actuating system of an automatic transmission wherein a control panel includes a plurality of push buttons each adapted to displace a control cable a predetermined distance to turn a lever which displaces a transmission actuator, said apparatus comprising separate clamping and locking devices, said clamping device including a bracket member, fastening means on said bracket member for holding it fixed relative to said control panel, and means on said bracket member for depressing at least one of said buttons and holding it in depressed position, said locking device including a body member, mounting means on said body member for locating said locking device relative to said lever, and connecting means on said body member for engaging said lever and locking it in proper position corresponding to the button depressed by said clamping device.

2. Adjusting apparatus for use with an actuating system for an automatic transmission wherein a control panel includes a plurality of push buttons each adapted to displace a control cable a predetermined distance to turn a lever which displaces a transmission actuator, said apparatus comprising separate clamping and locking devices, said clamping device including a bracket member adapted to fit about several of said buttons, a plurality of fastening screws in threaded engagement with said bracket for securing said clamping device relative to said control panel, said fastening screws extending substantially normal to the direction of motion of said push buttons when said clamping device is fitted about said push buttons, at least one of said fastening screws being slidable lateral to its longitudinal axis, and a depressing screw threaded onto said bracket and adapted to move in the same direction of motion of said push buttons for depressing at least one of said push buttons and maintaining it in a depressed position, said locking device including a body member, mounting means on said body member for locating said locking device relative to said lever, and connecting means on said body member for engaging said lever and locking it in proper position corresponding to the button depressed by said clamping device.

3. Adjusting apparatus for use with an actuating system of an automatic transmission wherein a control panel includes a plurality of push buttons each adapted to move in parallel to displace a control cable a predetermined distance to turn a lever movable within a housing and thereby normally displace a transmission actuator in said housing, and a removable element normally threaded in said housing to engage an arm portion of said lever in one position of said lever, said apparatus comprising separate clamping and locking devices, said clamping device having an annular bracket member for encompassing several of said buttons, said bracket including a cross-piece spanning opposed portions of said bracket member, a plurality of fastening screws in threaded engagement with said bracket for securing it relative to said control panel, said fastening screws extending normal to the direction of motion of said push buttons when said clamping device is fitted about said push buttons, at least one of said fastening screws being slidable lateral to its longitudinal axis, and a depressing screw threaded through said cross-piece and adapted to move in the same direction of motion of said push buttons for depressing at least one of said push buttons and maintaining it in a depressed position, said locking device having a substantially cylindrical body, said body including a solid end portion, a threaded central portion, and a stem portion, said stem portion being of smaller outside diameter than said central and end portions, and an axial bore in said body extending through said stem portion, said body being adapted to be mounted in said housing relative to said lever to restrain said arm portion with said bore.

4. A clamping device for use with a control panel having a plurality of push buttons adapted to move in parallel, said clamping device comprising an annular bracket member for encompassing several of said buttons, said bracket including a cross-piece spanning opposed portions of said bracket member, a plurality of fastening screws in threaded engagement with said bracket for securing it relative to said control panel, said fastening screws extending normal to the direction of motion of said push buttons when said clamping device is mounted on said panel, at least one of said fastening screws being slidably mounted on said bracket lateral to its longitudinal axis, and a depressing screw mounted on said cross-piece to move in the same direction of motion of said push buttons for depressing at least one of said buttons and maintaining it in a depressed position.

References Cited in the file of this patent

UNITED STATES PATENTS

| | | |
|---|---|---|
| 759,560 | Sharp | May 10, 1904 |
| 1,554,468 | Tague | Sept. 22, 1925 |
| 2,258,022 | McKee | Oct. 7, 1941 |
| 2,478,111 | Kilian | Aug. 2, 1949 |
| 2,939,447 | Lucas | June 7, 1960 |